US012664900B2

(12) United States Patent
Domenech et al.

(10) Patent No.: US 12,664,900 B2
(45) Date of Patent: Jun. 23, 2026

(54) COOPERATIVE AND NON-COOPERATIVE SURFACE MANAGEMENT

(71) Applicant: Rockwell Collins, Inc., Cedar Rapids, IA (US)

(72) Inventors: Justin A. Domenech, Melbourne, FL (US); Mark A. Billsberry, Indialantic, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 197 days.

(21) Appl. No.: 18/436,843

(22) Filed: Feb. 8, 2024

(65) Prior Publication Data

US 2025/0259556 A1 Aug. 14, 2025

(51) Int. Cl.
*G08G 5/51* (2025.01)
*G08G 5/25* (2025.01)

(52) U.S. Cl.
CPC ................ *G08G 5/51* (2025.01); *G08G 5/25* (2025.01)

(58) Field of Classification Search
CPC .. G08G 5/51; G08G 5/25; G08G 5/21; G08G 5/26; G08G 5/723; G08G 5/80
See application file for complete search history.

(56) References Cited

U.S. PATENT DOCUMENTS

| | | | | |
|---|---|---|---|---|
| 7,379,014 | B1 | 5/2008 | Woodell et al. | |
| 7,495,600 | B2 | 2/2009 | Rees et al. | |
| 9,405,005 | B1 * | 8/2016 | Arteaga | G08G 5/55 |
| 9,620,024 | B1 * | 4/2017 | Mottram | G08G 5/32 |
| 9,847,034 | B1 * | 12/2017 | Plawecki | H04B 7/18506 |
| 10,140,876 | B2 | 11/2018 | Khatwa et al. | |
| 10,302,759 | B1 * | 5/2019 | Arteaga | G08G 5/80 |
| 11,495,134 | B2 | 11/2022 | Liu et al. | |
| 11,756,440 | B2 | 9/2023 | Poojary et al. | |
| 2008/0062011 | A1 | 3/2008 | Butler et al. | |
| 2018/0227041 | A1 * | 8/2018 | Alminde | G08G 5/727 |

FOREIGN PATENT DOCUMENTS

| | | | | |
|---|---|---|---|---|
| EP | 4485425 A1 * | 1/2025 | | G08G 5/56 |
| EP | 4371100 B1 * | 8/2025 | | G08G 5/727 |
| WO | WO-2016124198 A1 * | 8/2016 | | G08G 5/00 |

* cited by examiner

*Primary Examiner* — Mary Cheung
(74) *Attorney, Agent, or Firm* — Suiter Swantz IP

(57) ABSTRACT

A system and method for aircraft surface navigation is disclosed. The method may include receiving W-band data from a W-band sensor configured to detect objects including non-cooperative aircraft. The method may also include receiving Automatic Dependent Surveillance-Broadcast (ADS-B) data from an ADS-B receiver configured to receive ADS-B signals from cooperative aircraft. Additionally, the method may involve identifying navigation information based on the W-band data and the ADS-B data, the navigation information comprising cooperative traffic and non-cooperative traffic, and displaying the navigation information via a display.

19 Claims, 4 Drawing Sheets

100

COOPERATIVE AND NON-COOPERATIVE SURFACE MANAGEMENT

TECHNICAL FIELD

The present disclosure relates to aircraft surface navigation systems, and, more particularly, to detection of aircraft using radar and information broadcasting methods.

BACKGROUND

Aircraft surface navigation systems may be used to assist pilots in navigating on the ground, particularly during taxi operations. These systems typically rely on various methods to provide information about the aircraft's surroundings, including the presence of other aircraft and obstacles. One sensor used is the Automatic Dependent Surveillance-Broadcast (ADS-B) sensor, which receives signals from cooperative aircraft that are broadcasting their position and other information. However, ADS-B signals are not always necessarily available from every aircraft. For example, aircraft may be powered down and not using ADS-B at the moment, or may lack ADS-B compatible transmitters.

Further, taxi systems may rely on a pilot to drive the aircraft.

Therefore, there is a need for a system and method that can address at least some of these issues.

SUMMARY

A system for aircraft surface navigation is disclosed in accordance with one or more illustrative embodiments of the present disclosure. In one illustrative embodiment, the system may include a W-band sensor configured to detect objects including non-cooperative aircraft. In another illustrative embodiment, the system may include an Automatic Dependent Surveillance-Broadcast (ADS-B) receiver configured to receive ADS-B signals from cooperative aircraft. In another illustrative embodiment, the system may include a display. In another illustrative embodiment, the system may include a controller communicatively coupled to the display, the W-band sensor, and the ADS-B receiver. In another illustrative embodiment, the controller may include one or more processors configured to execute program instructions causing the processors to receive W-band data from the W-band sensor, receive ADS-B data from the ADS-B receiver, identify navigation information based on the W-band data and the ADS-B data, and display the navigation information via the display.

In a further aspect, the W-band sensor may be configured to operate at a frequency of more than 75 GHz and less than 110 GHz. In another aspect, the W-band sensor may be configured to operate at a frequency within 5 GHz of 77 GHz. In another aspect, the W-band sensor may include a single chip radar sensor integrated circuit. In another aspect, the controller may be further configured to control a taxi operation of the aircraft based on the navigation information. In another aspect, the navigation information may include a location of the non-cooperative traffic and obstacles on the ground. In another aspect, the navigation information may include a location of the cooperative aircraft. In another aspect, the W-band sensor may be integrated within a directional traffic awareness antenna configured to receive traffic avoidance information. In another aspect, the directional traffic awareness antenna may comprise a Traffic Collision Avoidance System (TCAS) antenna. In another aspect, the directional traffic awareness antenna may comprise a teardrop radome.

A method for aircraft surface navigation is disclosed in accordance with one or more illustrative embodiments of the present disclosure. In one illustrative embodiment, the method includes receiving W-band data from a W-band sensor, which is configured to detect objects including non-cooperative aircraft. In another illustrative embodiment, the method includes receiving Automatic Dependent Surveillance-Broadcast (ADS-B) data from an ADS-B receiver, which is configured to receive ADS-B signals from cooperative aircraft. In another illustrative embodiment, the method includes identifying navigation information based on the W-band data and the ADS-B data, the navigation information comprising cooperative traffic and non-cooperative traffic. In another illustrative embodiment, the method includes displaying the navigation information via a display.

In a further aspect, the W-band sensor may be configured to operate at a frequency of more than 75 GHz and less than 110 GHz. In another aspect, the W-band sensor may be configured to operate at a frequency within 5 GHz of 77 GHz. In another aspect, the W-band sensor may include a single chip radar sensor integrated circuit. In another aspect, the method may further include controlling, via a controller, a taxi operation of an aircraft based on the navigation information. In another aspect, the navigation information may include a location of the non-cooperative traffic and obstacles on the ground. In another aspect, the navigation information may include a location of the cooperative aircraft. In another aspect, the W-band sensor may be integrated within a directional traffic awareness antenna configured to receive traffic avoidance information. In another aspect, the directional traffic awareness antenna may comprise a Traffic Collision Avoidance System (TCAS) antenna. In another aspect, the directional traffic awareness antenna may comprise a teardrop radome.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1A:
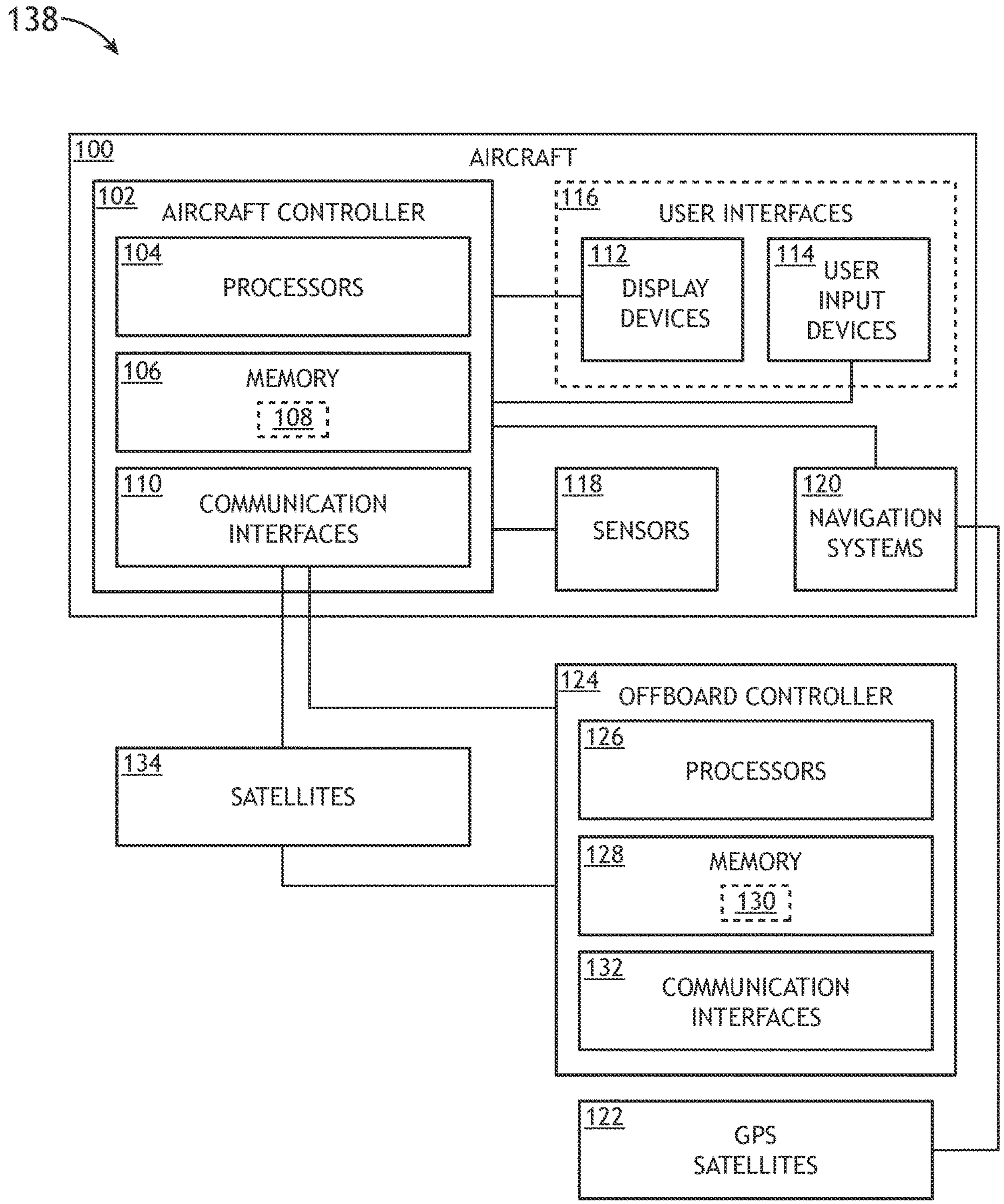
FIG. 1A is a simplified block diagram of an aircraft including the system for aircraft surface navigation, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Cooperative vehicle include vehicles that transmit some signal of their location. For example, cooperative vehicles may include aircraft that are actively transmitting their locations (e.g., transmitting using Automatic Dependent Surveillance-Broadcast (ADS-B)), and/or are able to be interrogated/queried for their locations (e.g., queried using secondary surveillance radar (SSR)). ADS-B is a surveillance technology that allows aircraft to determine their position via a Global Navigation Satellite System (GNSS) and periodically broadcast this information, along with other data such as velocity, which can be received by air traffic control ground-based or satellite-based receivers, as well as other aircraft equipped with "ADS-B In" technology.

Broadly speaking, embodiments of the concepts disclosed herein provide a system and method for aircraft surface navigation that utilizes a W-band sensor and an ADS-B receiver to detect and display navigation information, including both cooperative and non-cooperative aircraft locations. In embodiments, the system includes a W-band sensor configured to detect non-cooperative aircraft, and an ADS-B receiver configured to receive ADS-B signals from cooperative aircraft. In embodiments, the system also includes a display for presenting the navigation information to the pilot, and a controller that receives data from the W-band sensor and the ADS-B receiver, identifies navigation information based on the received data, and displays the navigation information via the display. In embodiments, the system may be used for automated taxi operations, such as driving an aircraft to avoid sensed obstacles and other aircraft.

Figure 1B:
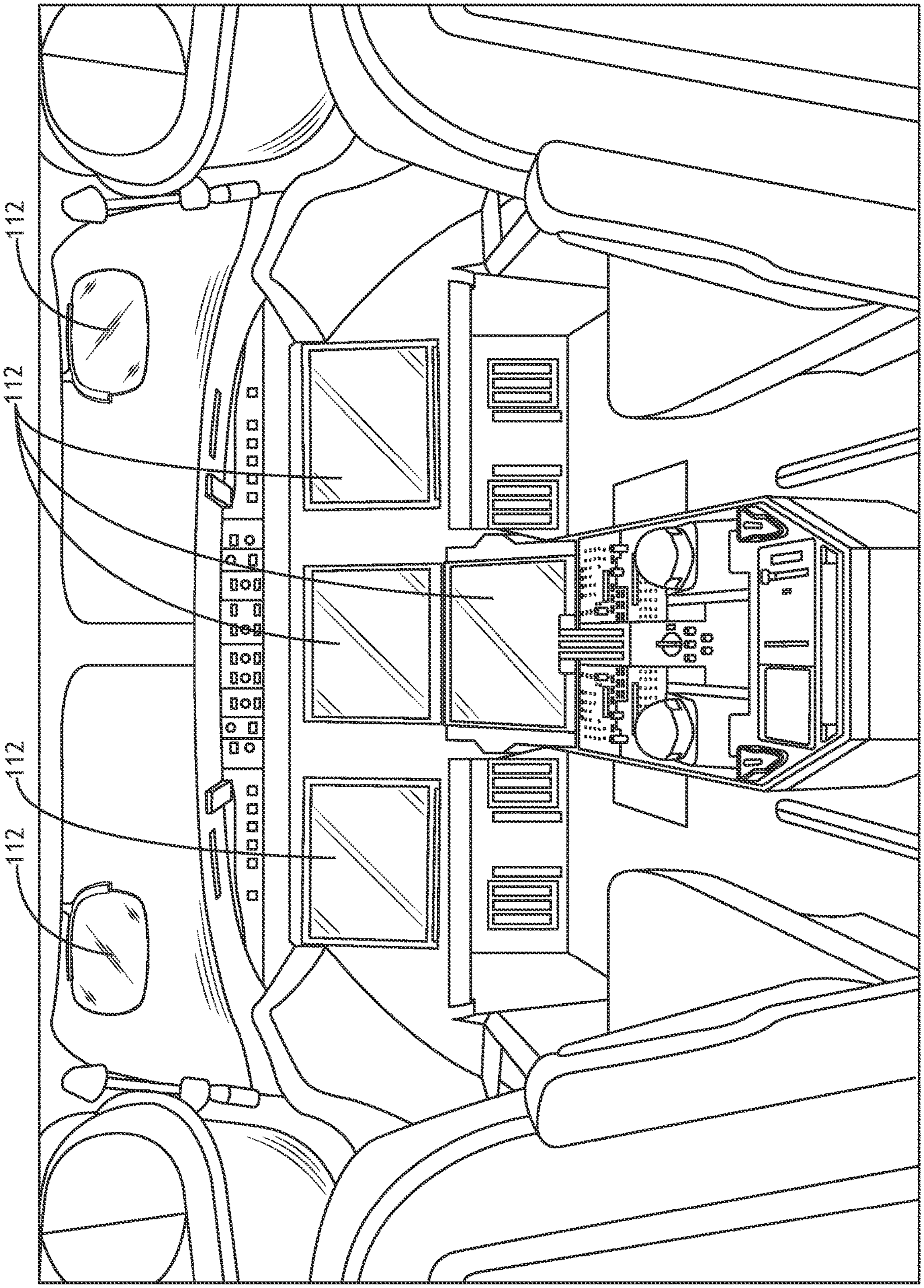
FIG. 1B is an aircraft including the system for aircraft surface navigation, in accordance with one or more embodiments of the present disclosure.

FIGS. 1A-1B illustrate an aircraft including a system for aircraft surface navigation, in accordance with one or more embodiments of the present disclosure.

Referring now to FIG. 1A, the aircraft 100 may include an aircraft controller 102 (e.g., on-board/run-time controller). The aircraft controller 102 may include one or more processors 104, memory 106 configured to store one or more program instructions 108, and/or one or more communication interfaces 110.

The aircraft 100 may include an avionics environment such as, but not limited to, a cockpit. The aircraft controller 102 may be coupled (e.g., physically, electrically, and/or communicatively) to one or more display devices 112. The one or more display devices 112 may be configured to display three-dimensional images and/or two-dimensional images. Referring now to FIG. 1B, the avionics environment (e.g., the cockpit) may include any number of display devices 112 (e.g., one, two, three, or more displays) such as, but not limited to, one or more head-down displays (HDDs) 112, one or more head-up displays (HUDs) 112, one or more multi-function displays (MFDs), one or more adaptive flight displays (AFDs) 112, one or more primary flight displays (PFDs) 112, or the like. The one or more display devices 112 may be employed to present flight data including, but not limited to, situational awareness data (e.g., navigation information) and/or flight queue data to a pilot or other crew member. For example, the situational awareness data (e.g., navigation information) may be based on, but is not limited to, aircraft performance parameters, aircraft performance parameter predictions, sensor readings, alerts, or the like.

Referring again to FIG. 1A, the aircraft controller 102 may be coupled (e.g., physically, electrically, and/or communicatively) to one or more user input devices 114. The one or more display devices 112 may be coupled to the one or more user input devices 114. For example, the one or more display devices 112 may be coupled to the one or more user input devices 114 by a transmission medium that may include wireline and/or wireless portions. The one or more display devices 112 may include and/or be configured to interact with one or more user input devices 114.

The one or more display devices 112 and the one or more user input devices 114 may be standalone components within the aircraft 100. It is noted herein, however, that the one or more display devices 112 and the one or more user input devices 114 may be integrated within one or more common user interfaces 116.

Where the one or more display devices 112 and the one or more user input devices 114 are housed within the one or more common user interfaces 116, the aircraft controller 102, one or more offboard controllers 124, and/or the one or more common user interfaces 116 may be standalone components. It is noted herein, however, that the aircraft controller 102, the one or more offboard controllers 124, and/or the one or more common user interfaces 116 may be integrated within one or more common housings or chassis.

The aircraft controller 102 may be coupled (e.g., physically, electrically, and/or communicatively) to and configured to receive data from one or more aircraft sensors 118. The one or more aircraft sensors 118 may be configured to sense a particular condition(s) external or internal to the aircraft 100 and/or within the aircraft 100. The one or more aircraft sensors 118 may be configured to output data associated with particular sensed condition(s) to one or more components/systems onboard the aircraft 100. Generally, the one or more aircraft sensors 118 may include, but are not limited to, one or more inertial measurement units, one or more airspeed sensors, one or more radio altimeters, one or more flight dynamic sensors (e.g., sensors configured to sense pitch, bank, roll, heading, and/or yaw), one or more weather radars, one or more air temperature sensors, one or more surveillance sensors, one or more air pressure sensors, one or more engine sensors, and/or one or more optical sensors (e.g., one or more cameras configured to acquire images in an electromagnetic spectrum range including, but not limited to, the visible light spectrum range, the infrared spectrum range, the ultraviolet spectrum range, or any other spectrum range known in the art).

The aircraft controller 102 may be coupled (e.g., physically, electrically, and/or communicatively) to and configured to receive data from one or more navigational systems 120. The one or more navigational systems 120 may be coupled (e.g., physically, electrically, and/or communicatively) to and in communication with one or more GPS satellites 122, which may provide vehicular location data (e.g., aircraft location data) to one or more components/systems of the aircraft 100. For example, the one or more navigational systems 120 may be implemented as a global navigation satellite system (GNSS) device, and the one or more GPS satellites 122 may be implemented as GNSS satellites. The one or more navigational systems 120 may include a GPS receiver and a processor. For example, the one or more navigational systems 120 may receive or calculate location data from a sufficient number (e.g., at least four) of GPS satellites 122 in view of the aircraft 100 such that a GPS solution may be calculated.

It is noted herein the one or more aircraft sensors 118 may operate as a navigation device 120, being configured to sense any of various flight conditions or aircraft conditions typically used by aircraft and output navigation data (e.g., aircraft location data, aircraft orientation data, aircraft direction data, aircraft speed data, and/or aircraft acceleration data). For example, the various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft bank, aircraft roll, aircraft yaw, aircraft heading, air temperature, and/or air pressure. By way of another example, the one or more aircraft sensors 118 may provide aircraft location data and aircraft orientation data, respectively, to the one or more processors 104, 126.

The aircraft controller 102 of the aircraft 100 may be coupled (e.g., physically, electrically, and/or communicatively) to one or more offboard controllers 124.

The one or more offboard controllers 124 may include one or more processors 126, memory 128 configured to store one or more programs instructions 130 and/or one or more communication interfaces 132.

The aircraft controller 102 and/or the one or more offboard controllers 124 may be coupled (e.g., physically, electrically, and/or communicatively) to one or more satellites 134. For example, the aircraft controller 102 and/or the one or more offboard controllers 124 may be coupled (e.g., physically, electrically, and/or communicatively) to one another via the one or more satellites 134. For instance, at least one component of the aircraft controller 102 may be configured to transmit data to and/or receive data from at least one component of the one or more offboard controllers 124, and vice versa. By way of another example, at least one component of the aircraft controller 102 may be configured to record event logs and may transmit the event logs to at least one component of the one or more offboard controllers 124, and vice versa. By way of another example, at least one component of the aircraft controller 102 may be configured to receive information and/or commands from the at least one component of the one or more offboard controllers 124, either in response to (or independent of) the transmitted event logs, and vice versa.

It is noted herein that the aircraft 100 and the components onboard the aircraft 100, the one or more offboard controllers 124, the one or more GPS satellites 122, and/or the one or more satellites 134 may be considered components of a system 138, for purposes of the present disclosure.

The one or more processors 104, 126 may include any one or more processing elements, micro-controllers, circuitry, field programmable gate array (FPGA) or other processing systems, and resident or external memory for storing data, executable code, and other information accessed or generated by the aircraft controller 102 and/or the one or more offboard controllers 124. In this sense, the one or more processors 104, 126 may include any microprocessor device configured to execute algorithms and/or program instructions. It is noted herein, however, that the one or more processors 104, 126 are not limited by the materials from which it is formed or the processing mechanisms employed therein and, as such, may be implemented via semiconductor(s) and/or transistors (e.g., using electronic integrated circuit (IC) components), and so forth. In general, the term "processor" may be broadly defined to encompass any device having one or more processing elements, which execute a set of program instructions from a non-transitory memory medium (e.g., the memory), where the set of program instructions is configured to cause the one or more processors to carry out any of one or more process steps.

The memory 106, 128 may include any storage medium known in the art suitable for storing the set of program instructions executable by the associated one or more processors. For example, the memory 106, 128 may include a non-transitory memory medium. For instance, the memory 106, 128 may include, but is not limited to, a read-only memory (ROM), a random access memory (RAM), a magnetic or optical memory device (e.g., disk), a magnetic tape, a solid state drive, flash memory (e.g., a secure digital (SD) memory card, a mini-SD memory card, and/or a micro-SD memory card), universal serial bus (USB) memory devices, and the like. The memory 106, 128 may be configured to provide display information to the display device (e.g., the one or more display devices 112). In addition, the memory 106, 128 may be configured to store user input information from a user input device of a user interface. The memory 106, 128 may be housed in a common controller housing with the one or more processors. The memory 106, 128 may, alternatively or in addition, be located remotely with respect to the spatial location of the processors and/or a controller. For instance, the one or more processors and/or the controller may access a remote memory (e.g., server), accessible through a network (e.g., internet, intranet, and the like).

The aircraft controller 102 and/or the one or more offboard controllers 124 may be configured to perform one or more process steps, as defined by the one or more sets of program instructions 108, 130. The one or more process steps may be performed iteratively, concurrently, and/or sequentially. The one or more sets of program instructions 108, 130 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, Boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 108, 130 may be configured to operate via proportional control, feedback control, feedforward control, integral control, proportional-derivative (PD) control, proportional-integral (PI) control, proportional-integral-derivative (PID) control, or the like.

The one or more communication interfaces 110, 132 may be operatively configured to communicate with one or more components of the aircraft controller 102 and/or the one or more offboard controllers 124. For example, the one or more communication interfaces 110, 132 may also be coupled (e.g., physically, electrically, and/or communicatively) with the one or more processors 104, 126 to facilitate data transfer between components of the one or more components of the aircraft controller 102 and/or the one or more offboard controllers 124 and the one or more processors 104, 126. For instance, the one or more communication interfaces 110, 132 may be configured to retrieve data from the one or more processors 104, 126, or other devices, transmit data for storage in the memory 106, 128, retrieve data from storage in the memory 106, 128, or the like. By way of another example, the aircraft controller 102 and/or the one or more offboard controllers 124 may be configured to receive and/or acquire data or information from other systems or tools by a transmission medium that may include wireline and/or wireless portions. By way of another example, the aircraft controller 102 and/or the one or more offboard controllers 124 may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the aircraft controller 102 and/or the one or more offboard controllers 124 and the other subsystems (e.g., of the aircraft 100 and/or the system 138). In addition, the aircraft controller 102 and/or the one or more offboard controllers 124 may be configured to send data to external systems via a transmission medium (e.g., network connection).

The one or more display devices 112 may include any display device known in the art. For example, the display devices 112 may include, but are not limited to, one or more head-down displays (HDDs), one or more HUDs, one or more multi-function displays (MFDs), or the like. For instance, the display devices 112 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user input devices 114 may include any user input device known in the art. For example, the user input device 114 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

Figure 2:
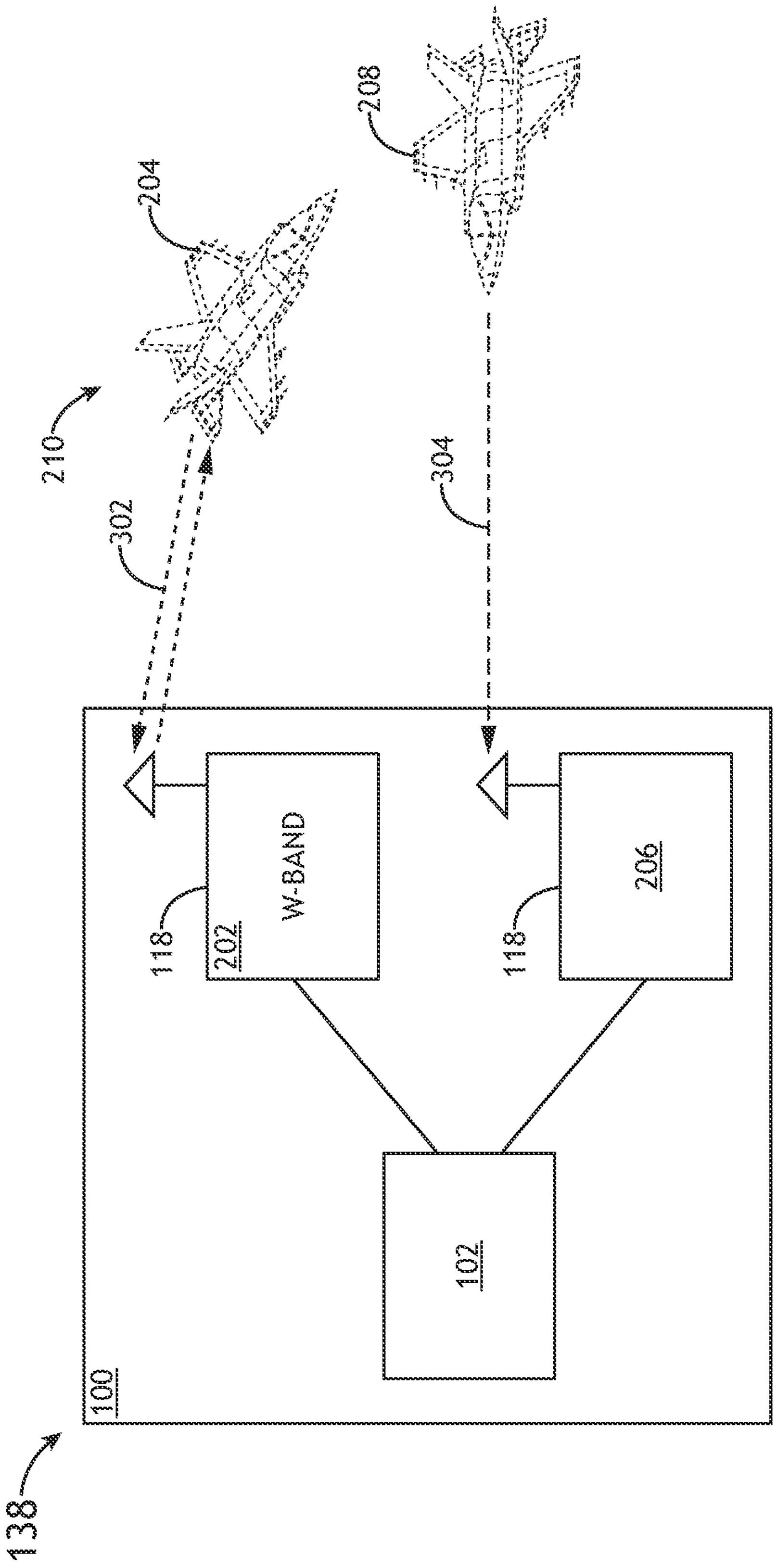
FIG. 2 is a block diagram of a system for aircraft surface navigation, in accordance with one or more embodiments of the present disclosure.

FIG. 2 illustrates a block diagram of a system 138 for aircraft surface navigation, in accordance with one or more embodiments of the present disclosure.

The system 138 for aircraft surface navigation may include a W-band sensor 202 (i.e., W-band radar sensor) configured to detect objects, including non-cooperative aircraft 204. The system 138 may further include an Automatic Dependent Surveillance-Broadcast (ADS-B) receiver 206 configured to receive ADS-B signals from cooperative aircraft 208. Additionally, the system 138 may include a display 112. A controller 102 may be communicatively coupled to the display 112, the W-band sensor 202, and the ADS-B receiver 206. The controller 102 may include one or more processors 106 configured to execute program instructions. These instructions may cause the one or more processors 106 to receive W-band data 302 from the W-band sensor 202, receive ADS-B data 304 from the ADS-B receiver 206, identify navigation information based on the W-band data and the ADS-B data, and display the navigation information via the display 112. The navigation information may include cooperative traffic and non-cooperative traffic (e.g., locations of non-cooperative aircraft 204).

The W-band sensor 202 may function to detect a range of objects 210 with varying degrees of radar cross-sections, potentially including non-cooperative aircraft 204, which may not actively broadcast their position. The use of the W-band frequency spectrum may afford the system 138 the ability to detect objects 210 with a fine resolution due to the relatively shorter wavelength of the W-band signals 302. The W-band sensor 202 may be configured to operate at frequencies more than 75 GHz but less than 110 GHz, The W-band sensor 202 may be configured to operate at frequencies within 5 GHz of 75 GHz. It could be postulated that operating within a frequency range proximal to 77 GHz, specifically within a 5 GHz margin, may optimize the balance between range, resolution, and potential interference with other systems.

The W-band sensor 202 may include a single chip radar sensor integrated circuit. A single-chip radar sensor integrated circuit (IC) may be a compact electronic component that integrates the components of a radar system into a single chip. These may include the transmitter, receiver, antennas, and signal processing capabilities. The integration of these components into a single chip allows for a reduction in size, cost, and power consumption, making it suitable for a wide range of applications, from automotive to industrial and consumer electronics.

The controller 102 may be further configured to control a taxi operation (e.g., auto taxi) of the aircraft based on the navigation information. In controlling taxi operations, the controller 102 may utilize the processed navigation information to assist pilots in maneuvering the aircraft 100 on the ground. The controller 102 may provide guidance through the display 112, indicating taxi routes while avoiding non-cooperative traffic and other obstacles. The controller 102 may also interface with other aircraft systems to suggest speed adjustments, provide warnings, and even integrate with an autopilot system for semi-autonomous taxi operations. By doing so, the system 138 may enhance safety and efficiency on the ground, reducing the risk of surface collisions and expediting aircraft movements. For example, controlling a taxi operation may include providing steering commands to the aircraft's nose wheel steering system or braking commands to the aircraft's braking system, enabling semi-autonomous or fully autonomous taxi operations. The system 138 may integrate with an Auto Taxi system, which uses the navigation information to navigate the aircraft along predefined taxi routes while avoiding collisions with other aircraft and obstacles 210.

The navigation information may include a location of the non-cooperative traffic and obstacles on the ground. For example, the navigation information may include the geographical location of non-cooperative traffic and ground obstacles, possibly expressed in terms of latitude and longitude coordinates, and/or as relative vectors from the aircraft 100 current position. This information may be beneficial in preventing runway incursions and ensuring safe distances are maintained from ground vehicles, personnel, and other aircraft that are not transmitting ADS-B signals.

The navigation information may include a location of the cooperative aircraft 208. For example, the location of the cooperative aircraft 208 may be in terms of latitude and longitude coordinates, and/or as relative vectors from the aircraft 100 current position.

The W-band sensor 202 may be integrated within a directional traffic awareness antenna configured to receive traffic avoidance information. The directional traffic awareness antenna may include a Traffic Collision Avoidance System (TCAS) antenna. For example, the directional traffic awareness antenna may include a teardrop radome. The directional traffic awareness antenna, which may feature and or be characterized by a teardrop-shaped radome, may minimize aerodynamic drag.

The placement of the W-band radar sensors 202 on the aircraft 100 may be strategically selected to provide coverage of the ground environment. Potential mounting locations may include the aircraft nose, wingtips, or tail section, where the W-band radar sensors 202 can provide a 360-degree view around the aircraft 100, minimizing blind spots and enhancing detection capabilities.

Figure 3:
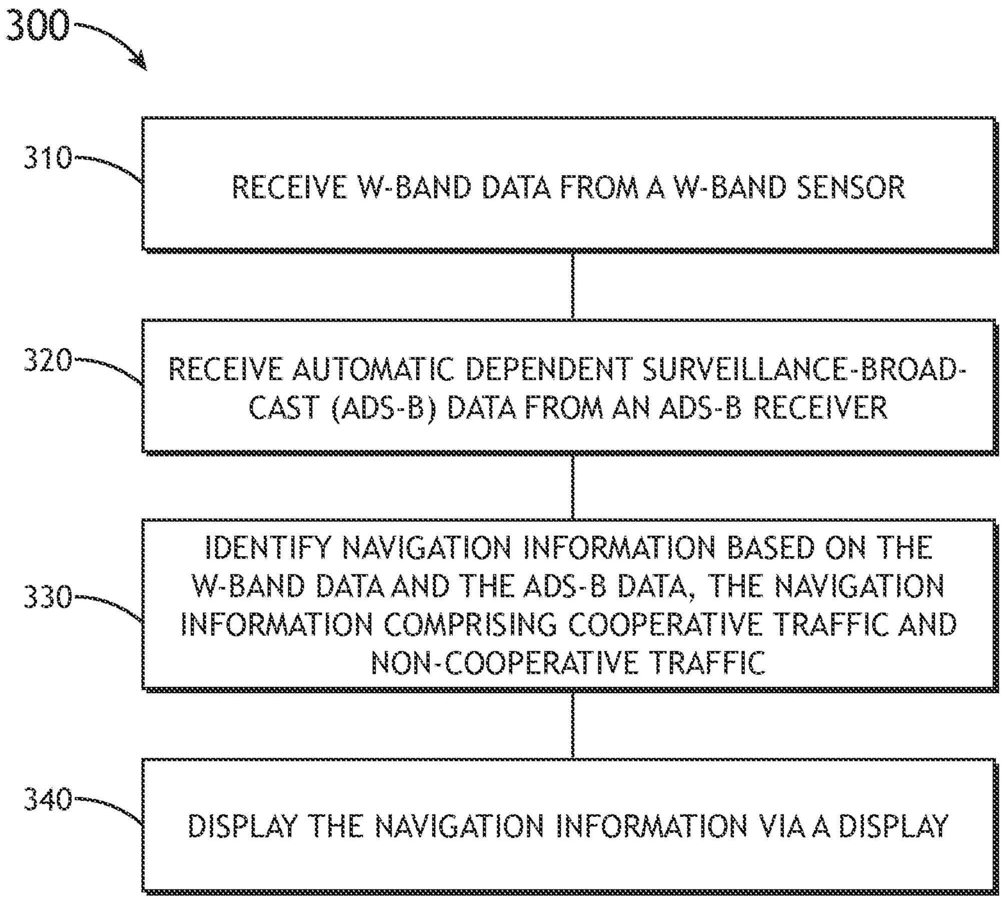
FIG. 3 is a flow diagram illustrating steps performed in a method for a parallelized boot using a boot prefetch module, in accordance with one or more embodiments of the present disclosure

FIG. 3 illustrates a flow diagram illustrating steps performed in a method 300, in accordance with one or more embodiments of the present disclosure At step 310, W-band data 302 is received from a W-band sensor 202.

At step 320, Automatic Dependent Surveillance-Broadcast (ADS-B) data 304 is received from an ADS-B receiver 206.

At step 330, navigation information based on the W-band data 302 and the ADS-B data 304 is identified. The controller 102 may process the received data to determine the position, velocity, and trajectory of both cooperative aircraft 208 and non-cooperative aircraft 204 and obstacles 210 on the ground. The cooperative traffic 208 may be identified using ADS-B data 304, which may provide real-time positional information from aircraft equipped with ADS-B transmitters. The non-cooperative traffic 204 and other obstacles 210, which may include aircraft without active ADS-B transmitters, other runway vehicles, and other objects, may be detected using the W-band sensor 202. The W-band radar technology may be particularly adept at identifying objects 210 with high resolution due to its short wavelength, allowing for precise detection and ranging of objects 210 on the airport surface.

At step 340, the navigation information is displayed via a display 112. The display 112 may be part of the aircraft's cockpit instrumentation, such as a multifunction display (MFD) or a dedicated surface navigation display. The navigation information may be presented to the pilot in a graphical format, overlaying a map of the airport surface or as a synthetic vision system (SVS) view. The display may include icons, color coding, or other visual indicators to distinguish between cooperative aircraft 208, non-cooperative aircraft 204, and other obstacles 210. The system 138 may be configured to provide auditory or haptic feedback to alert the pilot of potential conflicts or required actions.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "in embodiments", "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A method for aircraft surface navigation comprising:

receiving W-band data from a W-band sensor, wherein the W-band sensor is configured to detect objects including non-cooperative aircraft;

receiving Automatic Dependent Surveillance-Broadcast (ADS-B) data from an ADS-B receiver, wherein the ADS-B receiver is configured to receive ADS-B signals from cooperative aircraft;

identifying navigation information based on the W-band data and the ADS-B data, the navigation information comprising cooperative traffic and non-cooperative traffic;

displaying the navigation information via a display; and controlling, via a controller, a taxi operation of an aircraft based on the navigation information.

2. The method of claim 1, wherein the W-band sensor is configured to operate at a frequency of more than 75 GHz and less than 110 GHz.

3. The method of claim 1, wherein the W-band sensor is configured to operate at a frequency of within 5 GHz of 77 GHz.

4. The method of claim 1, wherein the W-band sensor includes a single chip radar sensor integrated circuit.

5. The method of claim 1, wherein the navigation information includes a location of the non-cooperative traffic and obstacles on a ground.

6. The method of claim 1, wherein the navigation information includes a location of the cooperative aircraft.

7. The method of claim 1, wherein the W-band sensor is integrated within a directional traffic awareness antenna configured to receive traffic avoidance information.

8. The method of claim 7, wherein the directional traffic awareness antenna comprises a Traffic Collision Avoidance System (TCAS) antenna.

9. The method of claim 7, wherein the directional traffic awareness antenna comprises a teardrop radome.

10. A system for aircraft surface navigation, the system comprising:

a W-band sensor configured to detect objects including non-cooperative aircraft;

an Automatic Dependent Surveillance-Broadcast (ADS-B) receiver configured to receive ADS-B signals from cooperative aircraft;

a display; and a controller communicatively coupled to the display, the W-band sensor, and the ADS-B receiver, the controller comprising one or more processors configured to execute program instructions causing the one or more processors to:

receive W-band data from the W-band sensor;

receive ADS-B data from the ADS-B receiver;

identify navigation information based on the W-band data and the ADS-B data, the navigation information comprising cooperative traffic and non-cooperative traffic; and display the navigation information via the display.

11. The system of claim 10, wherein the W-band sensor is configured to operate at a frequency of more than 75 GHz and less than 110 GHz.

12. The system of claim 10, wherein the W-band sensor is configured to operate at a frequency within 5 GHz of 77 GHz.

13. The system of claim 10, wherein the W-band sensor includes a single chip radar sensor integrated circuit.

14. The system of claim 10, wherein the controller is further configured to control a taxi operation of an aircraft based on the navigation information.

15. The system of claim 10, wherein the navigation information includes a location of the non-cooperative traffic and obstacles on a ground.

16. The system of claim 10, wherein the navigation information includes a location of the cooperative aircraft.

17. The system of claim 10, wherein the W-band sensor is integrated within a directional traffic awareness antenna configured to receive traffic avoidance information.

18. The system of claim 17, wherein the directional traffic awareness antenna comprises a Traffic Collision Avoidance System (TCAS) antenna.

19. The system of claim 17, wherein the directional traffic awareness antenna comprises a teardrop radome.

* * * * *